(12) United States Patent
Kawamoto et al.

(10) Patent No.: US 8,757,818 B2
(45) Date of Patent: Jun. 24, 2014

(54) PROJECTION DISPLAY APPARATUS

(75) Inventors: Naoki Kawamoto, Tokyo (JP);
Yoshinori Kakuta, Tokyo (JP); Naoki Kanno, Tokyo (JP); Kimito Nishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 539 days.

(21) Appl. No.: 12/977,685

(22) Filed: Dec. 23, 2010

(65) Prior Publication Data

US 2011/0181839 A1     Jul. 28, 2011

(30) Foreign Application Priority Data

Jan. 26, 2010   (JP) ................................ 2010-013739

(51) Int. Cl.
*G03B 21/14*     (2006.01)

(52) U.S. Cl.
USPC ............................................. 353/119; 349/5

(58) Field of Classification Search
USPC ............... 353/119, 100, 101, 85; 349/5, 9, 58
See application file for complete search history.

(56) References Cited

U.S. PATENT DOCUMENTS

| | | | |
|---|---|---|---|
| 6,508,556 B1 * | 1/2003 | Ueda ................................ | 353/74 |
| 7,180,557 B2 * | 2/2007 | Shimizu ............................. | 349/5 |
| 7,237,910 B2 | 7/2007 | Kumai | |
| 2005/0237488 A1 * | 10/2005 | Yamasaki et al. ................ | 353/20 |
| 2006/0238717 A1 | 10/2006 | Maximus et al. | |
| 2009/0141254 A1 * | 6/2009 | Watabe et al. .................. | 353/101 |

FOREIGN PATENT DOCUMENTS

| | | |
|---|---|---|
| EP | 0999462 A1 | 5/2000 |
| EP | 1718084 A2 | 11/2006 |
| JP | 3092161 U | 12/2002 |
| JP | 2005-189653 A | 7/2005 |
| JP | 2006-330282 A | 12/2006 |
| JP | 2007-316318 A | 12/2007 |

* cited by examiner

*Primary Examiner* — Francis M Legasse, Jr.
*Assistant Examiner* — Jerry Brooks
(74) *Attorney, Agent, or Firm* — Birch, Stewart, Kolasch & Birch, LLP (57) ABSTRACT

Self-aligning mechanisms hold a condenser housing. The condenser housing is moved toward an integrator while tapered surfaces of the condenser housing of an LED light source unit are inserted along condenser lens guides of a projection unit. LED light source unit datum surfaces and datum surfaces of the projection unit abut against each other, and the tapered surfaces of the LED light source unit can no longer move toward the integrator along the condenser lens guides of the projection unit. In this state, the LED light source unit and the projection unit are coupled to each other.

3 Claims, 6 Drawing Sheets

PROJECTION DISPLAY APPARATUS

BACKGROUND OF THE INVENTION

1. Field of the Invention

The present invention relates to a projection display apparatus including a plurality of solid state light sources.

2. Description of the Background Art

Projection display apparatuses using solid state light sources such as light emitting diodes (LEDs) and lasers as light sources thereof, unlike projection display apparatuses using lamp light sources such as a halogen lamp, a high pressure mercury lamp, a metal halide lamp and a xenon lamp, have an advantage in that the light sources have a longer life. For this reason, the replacement of the light sources has not been considered to be important in the projection display apparatuses using solid state light sources.

On the other hand, a solid state light source includes precise and complicated optical systems such as, for example, three solid state light source elements for red, green and blue, a collimator lens, a combined optical system, and a light collection optical system (a condenser lens). Precise adjustment is required for the replacement of the solid state light source.

Conventionally, the need for the adjustment operation during the replacement is eliminated by integrating a solid state light source and a collective lens (in some cases, referred to hereinafter as a "collimator lens") together, as disclosed in, for example, Japanese Patent Application Laid-Open No. 2006-330282. This, however, is based on the assumption that the solid state light source and the collective lens are used together with a lamp light source, and does not assume an instance in which multiple solid state light sources are used to cause the optical axis of irradiation light on the light source side and the optical axis for incident light set on the projection side to coincide with each other.

Little consideration has been given to the replacement of light sources in the conventional projection display apparatuses using solid state light sources. The conventional projection display apparatuses using solid state light sources have a problem in that the adjustment of the optical axes during the replacement of the plurality of solid state light sources is not substantially achieved.

SUMMARY OF THE INVENTION

It is an object of the present invention to provide a projection display apparatus which eliminates the need for the adjustment of optical axes during the replacement of a plurality of solid state light sources and which is capable of projecting images at a level where the proper brightness of the plurality of light sources is maintained.

According to a first aspect of the present invention, a projection display apparatus includes a light source unit, and a projection unit. The light source unit includes a plurality of solid state light sources, and a light combining and concentrating section. The light combining and concentrating section combines light beams from the respective solid state light sources together, and then concentrates the combined light beam by using a predetermined light condensing lens to provide a concentrated output light beam. The projection unit includes an optical modulator, and a projection optical section. The optical modulator modulates the concentrated output light beam, based on information of an input signal. The projection optical section projects the light beam from the optical modulator in the form of an image onto a predetermined screen. The light source unit and the projection unit are configured to be separable from and connectable to each other. The light source unit and the projection unit include a light source unit alignment mechanism and a projection unit alignment mechanism, respectively. The light source unit alignment mechanism and the projection unit alignment mechanism are capable of performing alignment so that an optical axis of the predetermined light condensing lens and an optical axis for an incident light beam set in the projection unit coincide with each other when the light source unit and the projection unit are coupled to each other.

After an old light source unit is separated from the projection unit, the projection display apparatus according to the first aspect of the present invention is capable of causing the optical axis of the predetermined light condensing lens and the optical axis for the incident light beam to coincide with each other in association with a coupling operation for coupling a new light source unit and the projection unit to each other.

Thus, the projection display apparatus according to the first aspect of the present invention produces the effect of projecting an image on the predetermined screen with the proper brightness of the solid state light sources without any adjustment of the optical axes after the new light source unit is coupled to the projection unit, when the replacement of the light source unit is made.

According to a second aspect of the present invention, a projection display apparatus includes a light source unit, and a projection unit. The light source unit includes a plurality of solid state light sources, and a light combining section. The light combining section combines light beams from the respective solid state light sources together to provide a combined output light beam. The projection unit includes a light concentrating section, an optical modulator, and a projection optical section. The light concentrating section concentrates the combined output light beam by using a predetermined lens condensing lens. The optical modulator modulates the light beam received from the light concentrating section, based on information of an input signal. The projection optical section projects the light beam from the optical modulator in the form of an image onto a predetermined screen. The light source unit and the projection unit are configured to be separable from and connectable to each other.

The projection unit in the projection display apparatus according to the second aspect of the present invention incorporates the light concentrating section which concentrates the combined output light beam from the light source unit by using the predetermined light condensing lens. This determines the constant coincidence between the optical axis of the predetermined light condensing lens and the optical axis for the incident light beam from the predetermined light condensing lens.

Thus, the projection display apparatus according to the second aspect produces the effect of projecting an image on the predetermined screen with the proper brightness of the solid state light sources without any adjustment of the optical axes after coupling a new light source unit to the projection unit, only by providing the coupling when the replacement of the light source unit is made.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Preferred Embodiment>

Figure 1:
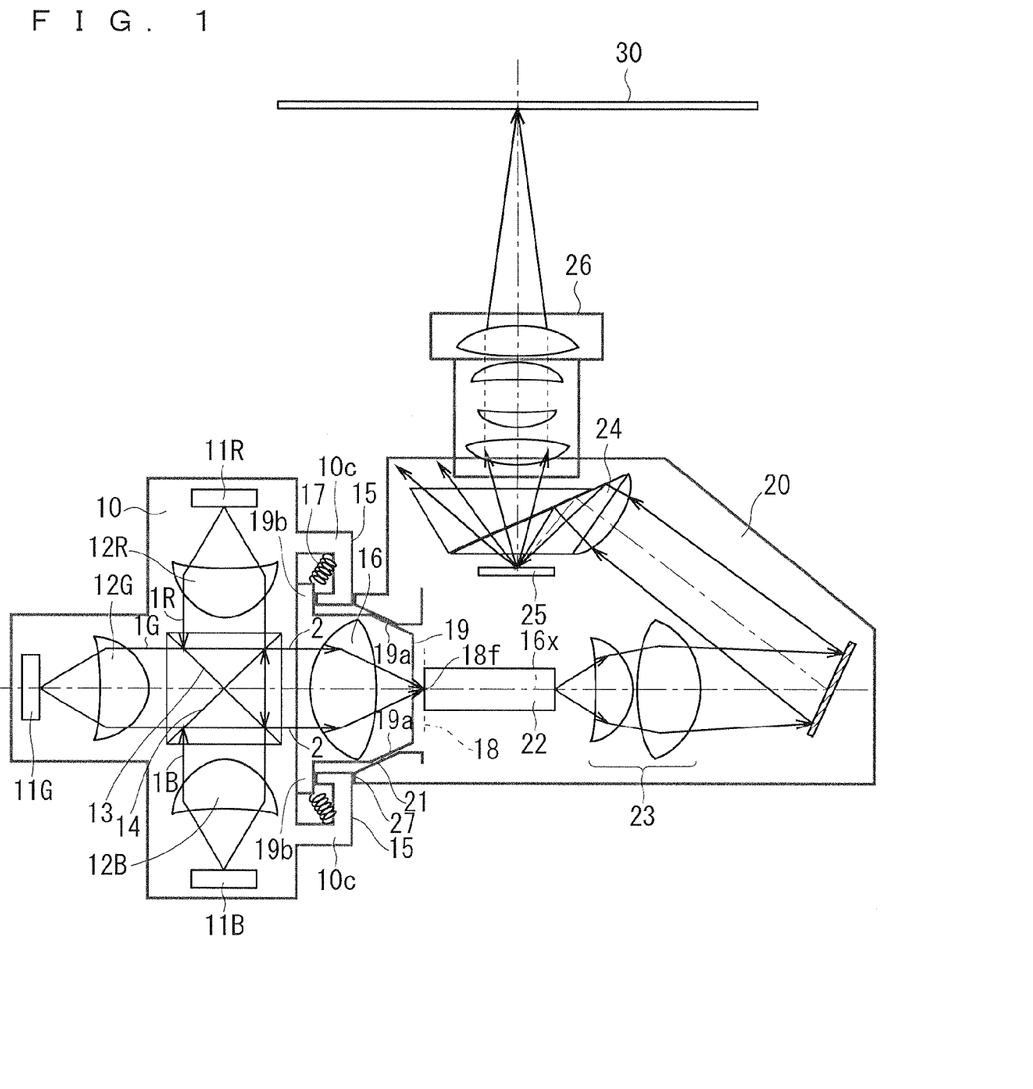
FIG. 1 is a view illustrating the overall construction of a projection display apparatus according to a first preferred embodiment of the present invention.
Figure 2:
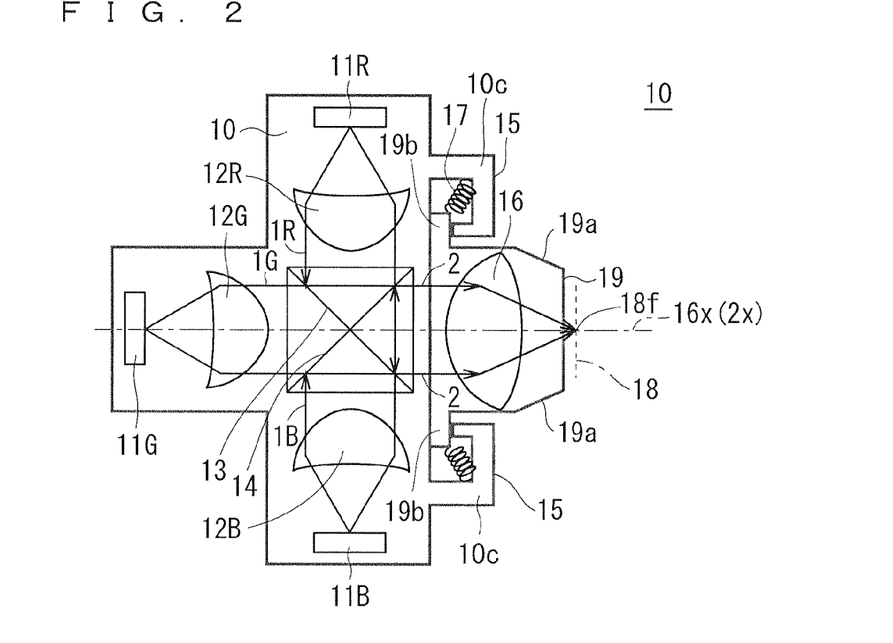
FIG. 2 is a view illustrating the construction of an LED light source unit shown in FIG. 1.
Figure 3:
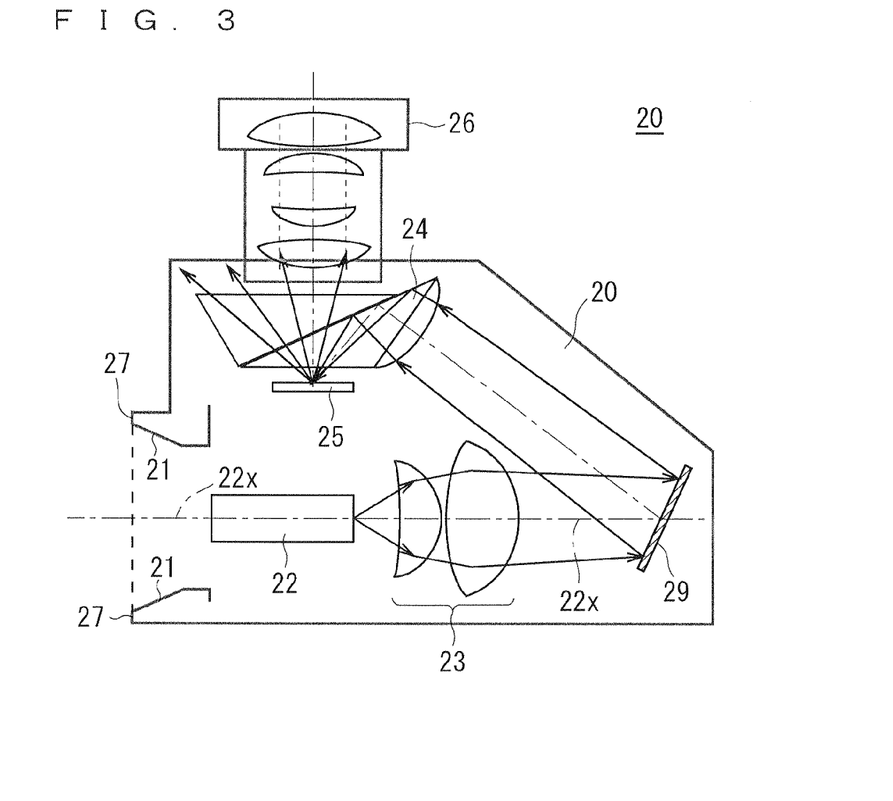
FIG. 3 is a view illustrating the construction of a projection unit shown in FIG. 1.

FIG. 1 is a view illustrating the overall construction of a projection display apparatus according to a first preferred embodiment of the present invention. FIG. 2 is a view illustrating the construction of an LED light source unit 10 shown in FIG. 1. FIG. 3 is a view illustrating the construction of a projection unit 20 shown in FIG. 1.

As shown in FIGS. 1 and 2, the LED light source unit 10 incorporates three LEDs 11 (a red LED 11R, a green LED 11G, and a blue LED 11B) that are fixed light sources, three collimator lenses 12 (collimator lenses 12R, 12G and 12B) corresponding respectively to the three LEDs 11, a red reflecting dichroic mirror 13, and a blue reflecting dichroic mirror 14. The LEDs 11, the collimator lenses 12, the red reflecting dichroic mirror 13, and the blue reflecting dichroic mirror 14 are fixed in predetermined locations in the LED light source unit 10.

The LED light source unit 10 further includes self-aligning mechanisms 17 which are elastic bodies. The self-aligning mechanisms 17 respectively have first ends connected to inside connecting ends 10c of the LED light source unit 10, and second ends connected to connecting portions 19b provided on opposite ends of a condenser housing 19 (a light condensing lens housing).

The condenser housing 19 includes a condenser lens 16 (a predetermined light condensing lens) incorporated in a predetermined inside position thereof, and is held slightly movably in upward, downward, leftward and rightward directions as seen in the figures by the elastic force of the self-aligning mechanisms 17. This allows the fine adjustment of the optical axis 16x of the condenser lens 16 in the condenser housing 19 relative to the LED light source unit 10 during the coupling of the LED light source unit 10 and the projection unit 20 to be described later.

The condenser housing 19 further includes tapered surfaces 19a provided in a portion protruding from the LED light source unit 10 and inclined inwardly in the direction of coupling to the projection unit 20.

Additionally, the LED light source unit 10 has LED light source unit datum surfaces 15 (stop surfaces) provided on the outside surface thereof and serving as surfaces opposed to the projection unit 20 when the LED light source unit 10 is coupled to the projection unit 20.

As shown in FIGS. 1 and 3, the projection unit 20 incorporates an integrator 22, a relay lens 23, a total reflection mirror 29, a total internal reflection prism 24, and a DMD chip 25 (an optical modulator). The projection unit 20 further includes a projection lens section 26 (a projection optical section) opposed to the DMD chip 25 and comprised of a plurality of projection lenses.

The projection unit 20 further includes condenser lens guides 21 that are tapered surfaces inclined inwardly toward the integrator 22 provided therein so as to be opposed to the tapered surfaces 19a of the condenser housing 19 when the projection unit 20 is coupled to the LED light source unit 10.

The projection unit 20 further includes projection unit datum surfaces 27 (stop surfaces) provided on the outside surface thereof. The projection unit datum surfaces 27 are provided in contiguous relation to the respective condenser lens guides 21 so as to be oriented to be held perpendicular to an integrator optical axis 22x. The projection unit datum surfaces 27 are further provided for abutment with the respective LED light source unit datum surfaces 15 when the projection unit 20 is coupled to the LED light source unit 10.

A specific method of bringing the LED light source unit datum surfaces 15 and the projection unit datum surfaces 27 into opposed relation to each other is, for example, as follows. Three small areas are made in parallel surfaces of the datum surfaces 15 so as to be perpendicular to the optical axis 2x of a collimated light beam 2, and three small areas are similarly made in parallel surfaces of the datum surfaces 27 in positions corresponding to the above-mentioned three areas so as to be perpendicular to the integrator optical axis 22x. As a result, when the LED light source unit 10 and the projection unit 20 are coupled to each other, the LED light source unit datum surfaces 15 and the projection unit datum surfaces 27 are in parallel and corresponding relation to each other.

As shown in FIG. 1, a screen 30 is provided in a predetermined position spaced apart in a direction in which the projection lens section 26 projects an image.

With such an arrangement, a red LED light beam 1R emitted from the red LED 11R is collimated by the corresponding collimator lens 12R, reflected from the red reflecting dichroic mirror 13, and then directed toward the condenser lens 16, as shown in FIG. 1.

On the other hand, a green LED light beam 1G emitted from the green LED 11G is collimated by the corresponding collimator lens 12G, transmitted through the red reflecting dichroic mirror 13 and the blue reflecting dichroic mirror 14, and then directed toward the condenser lens 16.

Also, a blue LED light beam 1B emitted from the blue LED 11B is collimated by the corresponding collimator lens 12B, reflected from the blue reflecting dichroic mirror 14, and then directed toward the condenser lens 16.

In this manner, the red reflecting dichroic mirror 13 and the blue reflecting dichroic mirror 14 which serve as a light combining section combine the red LED light beam 1R, the green LED light beam 1G and the blue LED light beam 1B together into the collimated light beam 2 on the same optical axis to direct the collimated light beam 2 toward the condenser lens 16.

The condenser lens 16 serving as a light concentrating section in the condenser housing 19 concentrates the collimated light beam 2 to direct a concentrated output light beam outwardly from the LED light source unit 10. The concentrated output light beam is a light beam concentrated on a condenser lens focal point 18f lying on an outside light concentration surface 18.

In this manner, light beams 1 (1R, 1G and 1B) from the LEDs 11 (11R, 11G and 11B) in the LED light source unit 10 are concentrated on the same point (the condenser lens focal point 18f).

In the LED light source unit 10, the positional relationship between the LEDs 11, the collimator lenses 12, and the dichroic mirrors 13 and 14 is previously determined by the above-mentioned method and the like so that the optical axis of the collimated light beam 2 is perpendicular to the LED light source unit datum surfaces 15.

The self-aligning mechanisms 17 holds the condenser lens 16 in the condenser housing 19 so that the optical axis 16x is perpendicular to the LED light source unit datum surfaces 15, and makes the condenser lens 16 slightly movable in a direction (in a vertical direction as seen in FIGS. 1 and 2) parallel to the LED light source unit datum surfaces 15 and in a direction (in a horizontal direction as seen in FIGS. 1 and 2) perpendicular to the LED light source unit datum surfaces 15.

In this manner, a light combining and concentrating section for combining and concentrating the light beams 1 includes the red reflecting dichroic mirror 13, the blue reflecting dichroic mirror 14, the condenser lens 16, the self-aligning mechanisms 17, and the condenser housing 19 as principal constituents thereof.

In the projection unit 20, on the other hand, the concentrated output light beam emitted from the LED light source unit 10 impinges on the incident surface of the integrator 22 when the projection unit 20 is coupled to the LED light source unit 10. The concentrated output light beam entering the integrator 22 is agitated therein to provide a uniform distribution at the light exiting surface of the integrator 22, and is collimated by the relay lens 23. This collimated light beam is reflected from the total reflection mirror 29, and then projected through the total internal reflection prism 24 onto the DMD chip 25.

The DMD chip 25 includes micromirrors each having an inclination changed in response to an input signal not shown to modulate a light beam into an ON light beam and an OFF light beam. Only the ON light beam is projected through the projection lens section 26 onto the screen 30 in the form of an image.

In the projection display apparatus according to the first preferred embodiment, when at least one of the red LED 11R, the green LED 11G and the blue LED 11B reaches the end of its life or fails, the LED light source unit 10 is replaced in whole. That is, the LED light source unit 10 that needs replacement is separated from the projection unit 20, and is replaced with a new LED light source unit 10.

The condenser housing 19 of the new LED light source unit 10 is moved toward the integrator 22 (in the rightward direction as seen in FIG. 1) while the tapered surfaces 19a of the condenser housing 19 are inserted along the condenser lens guides 21 of the projection unit 20. Thus, the operation of coupling the new LED light source unit 10 and the projection unit 20 to each other is performed.

Finally, the LED light source unit datum surfaces 15 and the datum surfaces 27 of the projection unit 20 opposed to the datum surfaces 15 abut against each other, and the tapered surfaces 19a of the new LED light source unit 10 can no longer move toward the integrator 22 along the condenser lens guides 21 of the projection unit 20. In this state, the LED light source unit 10 and the projection unit 20 are coupled to each other.

As a result, when the LED light source unit 10 and the projection unit 20 are coupled to each other, the positioning is done so that the optical axis 2x of the collimated light beam 2 of the LED light source unit 10 and the integrator optical axis 22x that is an optical axis for an incident light beam of the projection unit 20 are parallel to each other.

Further, when the LED light source unit 10 is replaced with a new LED light source unit 10 and the operation of coupling the new LED light source unit 10 and the projection unit 20 to each other is performed, the condenser housing 19 is guided by the condenser lens guides 21 of the projection unit 20. Then, the optical axis 16x of the condenser lens 16 in the LED light source unit 10 and the integrator optical axis 22x in the projection unit 20 coincide with each other automatically (without any subsequent adjustment) when the new LED light source unit 10 and the projection unit 20 are coupled to each other. After the completion of the coupling operation, a fixing process such as screwing in predetermined locations may be performed.

The replacement of the LED light source unit 10 in the projection display apparatus according to the first preferred embodiment in the above-mentioned manner causes the optical axis 16x of the condenser lens 16 and the integrator optical axis 22x (the optical axis for an incident light beam) to automatically coincide with each other. This eliminates the need to make the subsequent optical axis adjustment, thereby achieving the projection of images on the screen 30 with the proper brightness of the LEDs 11 maintained.

The positioning accuracy of the collimated light beam 2 that is a combined light beam and the condenser lens 16 will be described. FIGS. 4 to 7 are views illustrating the positioning accuracy of the collimated light beam 2 and the condenser lens 16.

Figure 4:
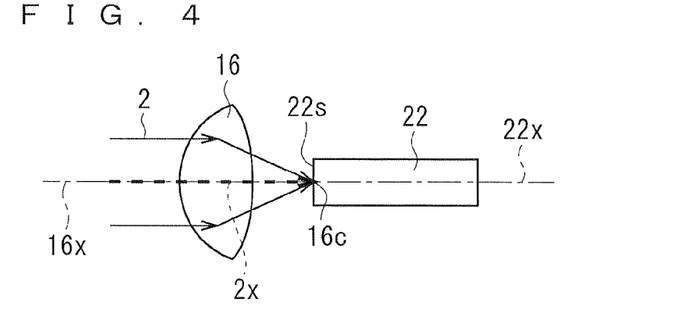
FIGS. 4 to 7 are views illustrating the positioning accuracy of a collimated light beam and a condenser lens.
Figure 5:
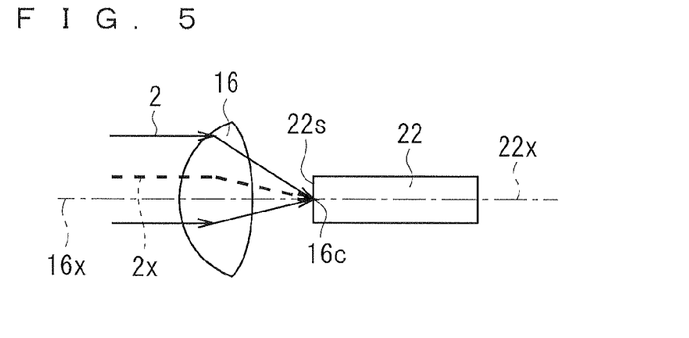
Figure 6:
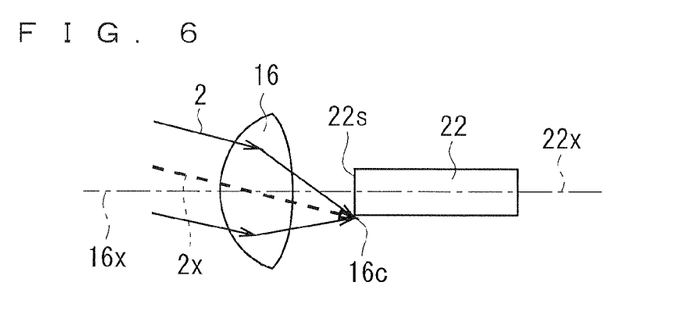
Figure 7:
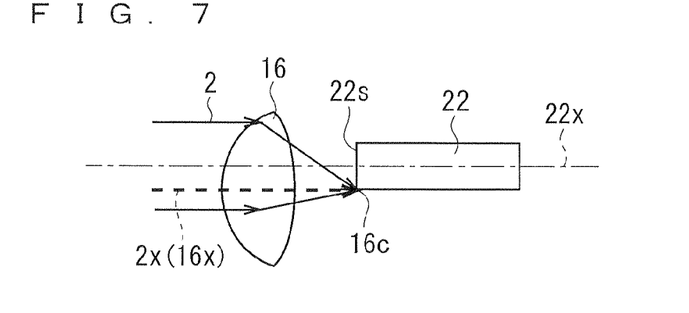

FIG. 4 shows a relationship in which the collimated light beam 2 is concentrated in normal fashion. FIG. 5 shows that the optical axis 2x of the incident collimated light beam is displaced from the optical axis 16x of the condenser lens 16. FIG. 6 shows that the collimated light beam 2 in an inclined position enters the condenser lens 16. FIG. 7 shows that the optical axis 16x of the condenser lens 16 and the integrator optical axis 22x are displaced from each other.

When the relationship in which the collimated light beam 2 is concentrated in normal fashion exists as shown in FIG. 4, the optical axis 2x, the optical axis 16x of the condenser lens 16, and the integrator optical axis 22x coincide with each other.

As shown in FIG. 5, there is a possibility that a displacement occurs between the optical axis 2x of the collimated light beam 2 and the optical axis 16x of the condenser lens 16 in the projection display apparatus according to the first preferred embodiment. This results from the possibility of a displacement between the red and blue reflecting dichroic mirrors 13 and 14 and the condenser lens 16.

However, a positioning mechanism comprised of the self-aligning mechanisms 17, the tapered surfaces 19a, and the LED light source unit datum surfaces 15 is provided in the LED light source unit 10, and a positioning mechanism comprised of the condenser lens guides 21, and the integrator 22 is provided in the projection unit 20. These positioning mechanisms achieve the positioning so that the optical axis 16x of the condenser lens 16 and the integrator optical axis 22x coincide with each other when the LED light source unit 10 and the projection unit 20 are coupled to each other.

Thus, the center 16c of the light beam concentrated on an incident surface 22s of the integrator 22 depends on the optical axis 16x of the condenser lens 16, and is positioned on the integrator optical axis 22x. For this reason, there is substantially no decrease in the amount of light concentrated on and entered into the incident surface 22s of the integrator 22.

On the other hand, the center 16c of the light beam concentrated by the condenser lens 16 is displaced from the center of the integrator 22 (the integrator optical axis 22x) in the instances shown in FIGS. 6 and 7. For this reason, the amount of light entered into the integrator 22 is decreased.

In the projection display apparatus according to the first preferred embodiment, however, the setting is made so that the optical axis 2x of the collimated light beam 2 of the LED light source unit 10 and the integrator optical axis 22x that is the optical axis for the incident light beam of the projection unit 20 are parallel to each other. Thus, the relationship shown in FIG. 6 does not occur in the projection display apparatus according to the first preferred embodiment.

Also in the projection display apparatus according to the first preferred embodiment, the positioning mechanism in the LED light source unit 10 and the positioning mechanism in the projection unit 20 cause the optical axis 16x of the condenser lens 16 and the integrator optical axis 22x to coincide with each other when the LED light source unit 10 and the projection unit 20 are coupled to each other. Thus, the relationship shown in FIG. 7 does not occur in the projection display apparatus according to the first preferred embodiment.

When the condenser lens 16 is present in the LED light source unit 10, it is difficult to adjust the position of the optical axis relative to the projection unit 20. However, in the projection display apparatus according to the first preferred embodiment, the optical axis 16x of the condenser lens 16 is positioned so as to coincide with the optical axis (integrator optical axis 22x) for the incident light beam of the projection unit 20 with high precision, as mentioned above, when the LED light source unit 10 and the projection unit 20 are coupled to each other. Thus, after the coupling is provided between the LED light source unit 10 and the projection unit 20, there is substantially no decrease in the amount of light from the LEDs 11 without any subtle optical axis adjustment between the LED light source unit 10 and the projection unit 20.

(Effect)

Thus, when the replacement of the LED light source unit 10 is made, the projection display apparatus according to the first preferred embodiment produces the effect of providing the proper brightness of the LEDs 11 without any adjustment after the coupling between the LED light source unit 10 and the projection unit 20, thereby finally projecting an image from the projection lens section 26 onto the screen 30.

As mentioned above, the LED light source unit 10 and the projection unit 20 in the projection display apparatus according to the first preferred embodiment include a light source unit alignment mechanism and a projection unit alignment mechanism, respectively, which are capable of performing alignment so that the optical axis 16x of the condenser lens 16 and the integrator optical axis 22x that is the optical axis for the incident light beam set in the projection unit 20 coincide with each other when the LED light source unit 10 and the projection unit 20 are coupled to each other. The light source unit alignment mechanism principally includes the tapered surfaces 19a of the condenser housing 19, the LED light source unit datum surfaces 15, and the self-aligning mechanisms 17. The projection unit alignment mechanism principally includes the condenser lens guides 21, and the projection unit datum surfaces 27.

During the replacement of the LED light source unit 10, the old LED light source unit 10 is separated from the projection unit 20, and thereafter the coupling operation is performed to couple a new LED light source unit 10 to the projection unit 20. In association with this coupling operation, the setting is made so that the optical axis 16x of the condenser lens 16 and the optical axis (the integrator optical axis 22x) for the incident light beam coincide with each other.

The projection display apparatus according to the first preferred embodiment therefore produces the effect of projecting an image on the screen 30 with the proper brightness of the LEDs 11 without any adjustment of the optical axes after the new LED light source unit 10 is coupled to the projection unit 20, when the replacement of the LED light source unit 10 is made.

Further, the coupling operation is performed in the following manner. First, the condenser housing 19 is moved toward the integrator 22 while the tapered surfaces 19a of the condenser housing 19 of the LED light source unit 10 are inserted along the condenser lens guides 21 of the projection unit 20. Finally, the LED light source unit datum surfaces 15 and the datum surfaces 27 of the projection unit 20 opposed to the datum surfaces 15 abut against each other, and the tapered surfaces 19a of the LED light source unit 10 can no longer move toward the integrator 22 along the condenser lens guides 21 of the projection unit 20. In this state, the LED light source unit 10 and the projection unit 20 are coupled to each other.

In this manner, the operation of coupling between the LED light source unit 10 and the projection unit 20 is performed easily with precision by using the tapered surfaces 19a and the LED light source unit datum surfaces 15 which serve as the light source unit positioning mechanism, and the condenser lens guides 21 and the projection unit datum surfaces 27 which serve as the projection unit positioning mechanism.

Additionally, the self-aligning mechanisms 17 serving as a housing holding mechanism hold the condenser housing 19 slightly movably. This allows the positioning of the condenser housing 19 in a desired location relatively smoothly while slightly moving the condenser housing 19 when the LED light source unit 10 and the projection unit 20 are coupled to each other.

Further, the condenser housing 19 is guided to a proper position relatively easily by inserting the tapered surfaces 19a of the condenser housing 19 of the LED light source unit 10 along the condenser lens guides 21 of the projection unit 20.

In addition, when the LED light source unit datum surfaces 15 and the datum surfaces 27 of the projection unit 20 abut against each other, the LED light source unit 10 and the projection unit 20 are coupled to each other. This allows the recognition of the coupling with reliability.

(Modifications)

Although the LEDs are used as light sources in the first preferred embodiment, lasers may be used to produce similar effects. Also, the method of combining the LED light sources illustrated herein is a cross mirror scheme. However, a mirror sequential combination scheme may be used instead.

Figure 8:
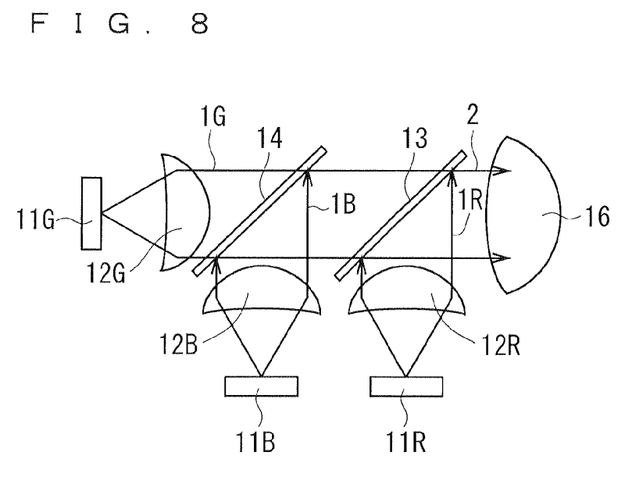
FIG. 8 is a view illustrating a construction example of a mirror sequential combination scheme.

FIG. 8 is a view illustrating a construction example of the mirror sequential combination scheme. The details on the combination of light beams by the use of the mirror sequential combination scheme will be described, with reference to FIG. 8.

The green LED light beam 1G emitted from the green LED 11G is collimated by the corresponding collimator lens 12G, transmitted through the blue reflecting dichroic mirror 14 and the red reflecting dichroic mirror 13, and then directed toward the condenser lens 16.

The blue LED light beam 1B emitted from the blue LED 11B is collimated by the corresponding collimator lens 12B, reflected from the blue reflecting dichroic mirror 14, transmitted through the red reflecting dichroic mirror 13, and then directed toward the condenser lens 16.

The red LED light beam 1R emitted from the red LED 11R is collimated by the corresponding collimator lens 12R, reflected from the red reflecting dichroic mirror 13, and then directed toward the condenser lens 16.

In this manner, the red reflecting dichroic mirror 13 and the blue reflecting dichroic mirror 14 which serve as a light combining section combine the red LED light beam 1R, the green LED light beam 1G and the blue LED light beam 1B together into the collimated light beam 2 on the same optical axis to direct the collimated light beam 2 toward the condenser lens 16.

Other structures and operations in the mirror sequential combination scheme are similar to those in the cross mirror scheme illustrated in FIGS. 1 and 2, and will not be described.

The instance in which the DMD chip 25 is used as a light valve in the projection unit 20 which constitutes the optical modulator is described. However, a liquid crystal panel may be used as the light valve.

<Second Preferred Embodiment>

Figure 9:
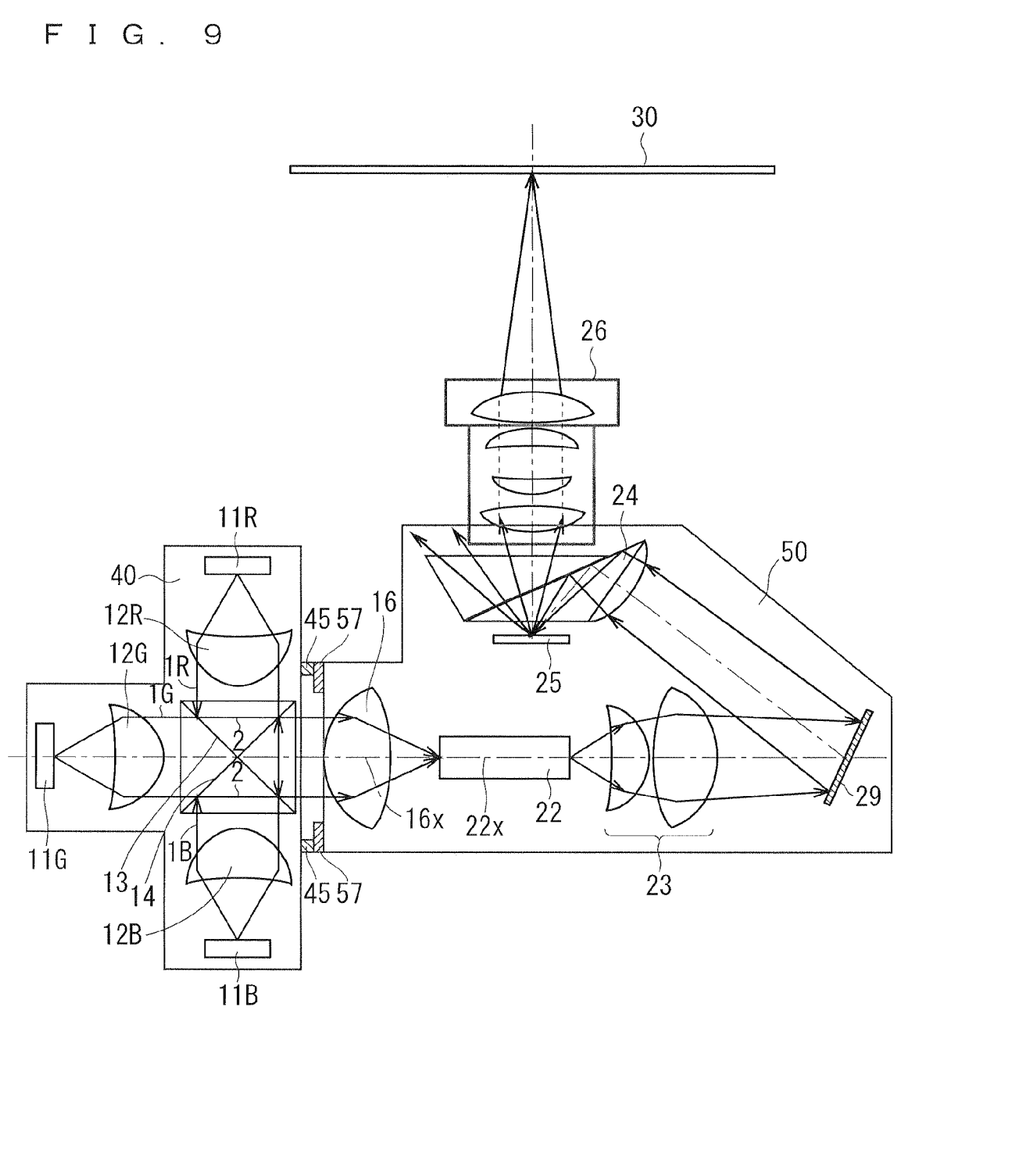
FIG. 9 is a view illustrating the overall construction of a projection display apparatus according to a second preferred embodiment of the present invention.
Figure 10:
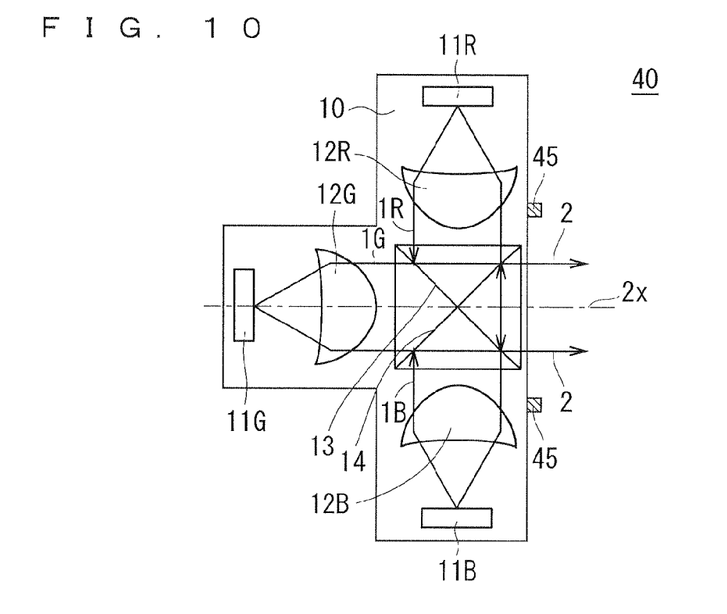
FIG. 10 is a view illustrating the construction of an LED light source unit shown in FIG. 9.
Figure 11:
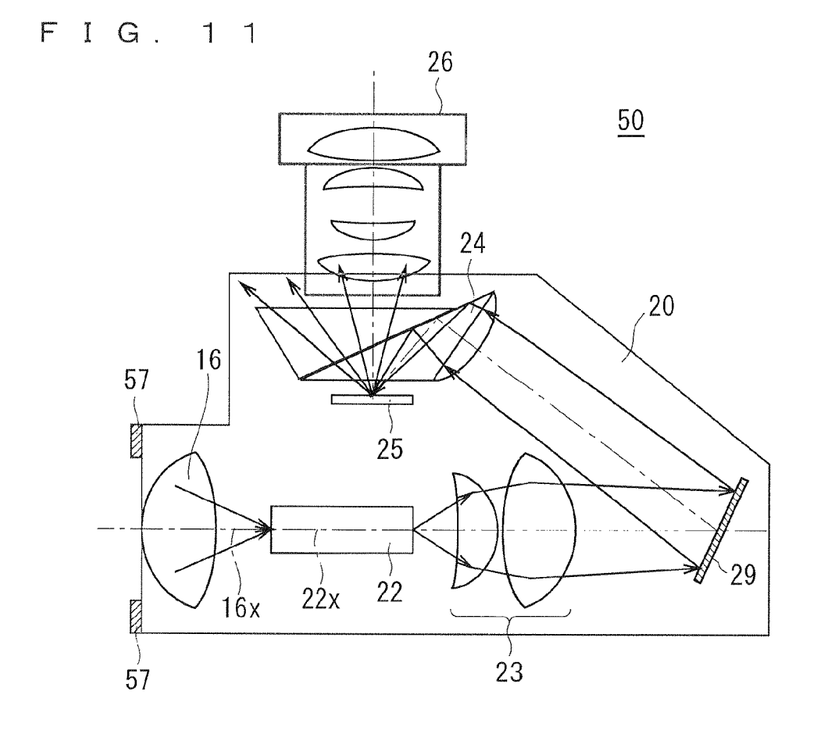
FIG. 11 is a view illustrating the construction of a projection unit shown in FIG. 9.

FIG. 9 is a view illustrating the overall construction of a projection display apparatus according to a second preferred embodiment of the present invention. FIG. 10 is a view illustrating the construction of an LED light source unit 40 shown in FIG. 9. FIG. 11 is a view illustrating the construction of a projection unit 50 shown in FIG. 9.

Like the LED light source unit 10 of the first preferred embodiment, the LED light source unit 40 incorporates the three LEDs 11 (the red LED 11R, the green LED 11G, and the blue LED 11B) that are fixed light sources, the three collimator lenses 12 (the collimator lenses 12R, 12G and 12B) corresponding respectively to the three LEDs 11, the red reflecting dichroic mirror 13, and the blue reflecting dichroic mirror 14, as shown in FIGS. 9 and 10. The LEDs 11, the collimator lenses 12, the red reflecting dichroic mirror 13, and the blue reflecting dichroic mirror 14 are fixed in predetermined locations in the LED light source unit 40.

The LED light source unit 40 further includes protrusions which become LED light source unit datum surfaces 45 opposed to the projection unit 50 when the LED light source unit 40 is coupled to the projection unit 50. A specific method of bringing the LED light source unit datum surfaces 45 and projection unit datum surfaces 57 into opposed relation to each other is similar to that of the first preferred embodiment.

As shown in FIGS. 9 and 11, the projection unit 50 incorporates the condenser lens 16, the integrator 22, the relay lens 23, the total reflection mirror 29, the total internal reflection prism 24, and the DMD chip 25. The projection unit 50 further includes the projection lens section 26 opposed to the DMD chip 25 and comprised of a plurality of projection lenses.

The projection unit 50 further includes the projection unit datum surfaces 57 that are outside protrusions. The projection unit datum surfaces 57 are provided for abutment with the respective LED light source unit datum surfaces 45 when the projection unit 50 is coupled to the LED light source unit 40.

As shown in FIG. 9, the screen 30 is provided in a predetermined position spaced apart in a direction in which the projection lens section 26 projects an image.

With such an arrangement, the red LED light beam 1R emitted from the red LED 11R is collimated by the corresponding collimator lens 12R, and then reflected from the red reflecting dichroic mirror 13, as shown in FIG. 9.

On the other hand, the green LED light beam 1G emitted from the green LED 11G is collimated by the corresponding collimator lens 12G, and then transmitted through the red reflecting dichroic mirror 13 and the blue reflecting dichroic mirror 14.

Also, the blue LED light beam 1B emitted from the blue LED 11B is collimated by the corresponding collimator lens 12B, and then reflected from the blue reflecting dichroic mirror 14.

In the above-mentioned manner, the red reflecting dichroic mirror 13 and the blue reflecting dichroic mirror 14 which serve as a light combining section combine the red LED light beam 1R, the green LED light beam 1G and the blue LED light beam 1B together into the collimated light beam 2 on the same optical axis to direct the collimated light beam 2 as a combined output light beam outwardly from the LED light source unit 40.

In the LED light source unit 40, the positional relationship between the LEDs 11, the collimator lenses 12, and the dichroic mirrors 13 and 14 is previously determined so that the optical axis $2x$ of the collimated light beam 2 is perpendicular to the LED light source unit datum surfaces 45.

In the projection unit 50, on the other hand, the combined output light beam (the collimated light beam 2) emitted from the LED light source unit 40 is concentrated by the condenser lens 16, and thereafter impinges on the incident surface of the integrator 22 when the projection unit 50 is coupled to the LED light source unit 40. The light beam entering the integrator 22 is agitated therein to provide a uniform distribution at the light exiting surface of the integrator 22, and is collimated by the relay lens 23. This collimated light beam is reflected from the total reflection mirror 29, and then projected through the total internal reflection prism 24 onto the DMD chip 25.

The DMD chip 25 includes micromirrors each having an inclination changed in response to an input signal not shown to modulate a light beam into an ON light beam and an OFF light beam. Only the ON light beam is projected through the projection lens section 26 in the form of an image on the screen 30.

The positional relationship in the projection unit 50 is previously determined so that the optical axis $16x$ of the condenser lens 16 and the integrator optical axis $22x$ of the integrator 22 coincide with each other.

In the projection display apparatus according to the second preferred embodiment, when at least one of the red LED 11R, the green LED 11G and the blue LED 11B reaches the end of its life or fails, the LED light source unit 40 is replaced in whole. That is, the LED light source unit 40 that needs replacement is separated from the projection unit 50, and is replaced with a new LED light source unit 40.

The positioning is done so that the LED light source unit datum surfaces 45 of the new LED light source unit 40 and the projection unit datum surfaces 57 of the projection unit 50 abut against each other. Then, the operation of coupling the LED light source unit 40 and the projection unit 50 to each other is performed. After the completion of the coupling operation, a fixing process such as screwing or pressing with a hook is performed on the abutting portions of the LED light source unit datum surfaces 45 and the projection unit datum surfaces 57.

In this process, the condenser lens 16 and the integrator 22 are both present in the projection unit 50. Thus, the coincident relationship between the optical axis $16x$ of the condenser lens 16 and the integrator optical axis $22x$ is previously determined.

As described in the first preferred embodiment with reference to FIG. 5, when the optical axis $16x$ of the condenser lens 16 and the integrator optical axis $22x$ coincide with each other, the parallel relationship held between the optical axis of the combined output light beam (the collimated light beam 2) and the optical axis $16x$ prevents the significant decrease in the brightness of the LEDs 11 if some position displacement occurs. Also, the relationships shown in FIGS. 6 and 7 do not occur, as in the first preferred embodiment.

(Effect)

When the LED light source unit 40 is replaced in the projection display apparatus according to the second preferred embodiment in the above-mentioned manner, the optical axis 16x of the condenser lens 16 and the integrator optical axis 22x (the optical axis for the incident light beam) coincide with each other. This produces the effect of providing the proper brightness of the LEDs 11 without the need to make the subsequent optical axis adjustment.

As mentioned above, the projection unit 50 in the projection display apparatus according to the second preferred embodiment incorporates the condenser lens 16 serving as a light concentrating section for concentrating the combined output light beam (the collimated light beam 2) from the LED light source unit 40. This determines the constant coincidence between the optical axis 16x of the condenser lens 16 and the integrator optical axis 22x.

The projection display apparatus according to the second preferred embodiment therefore produces the effect of projecting an image on the screen 30 with the proper brightness of the LEDs 11 without any adjustment of the optical axes after coupling the new LED light source unit 40 to the projection unit 50, only by providing the coupling when the replacement of the LED light source unit 40 is made.

(Modifications)

The use of solid state light sources such as lasers as light sources in the second preferred embodiment produces similar effects. Also, the mirror sequential combination scheme may be used for the combination of light sources. Also, a liquid crystal panel may be used as the light valve serving as the optical modulator. In other words, modifications similar to those of the first preferred embodiment may be made in the second preferred embodiment.

While the invention has been described in detail, the foregoing description is in all aspects illustrative and not restrictive. It is understood that numerous other modifications and variations can be devised without departing from the scope of the invention.

What is claimed is:

1. A projection display apparatus comprising:
   a light source unit; and
   a projection unit,
   said light source unit including:
      a plurality of solid state light sources, and
      a light combining and concentrating section for combining light beams from the respective solid state light sources together and then concentrating the combined light beam by using a predetermined light condensing lens to provide a concentrated output light beam, said light combining and concentrating section including:
         a light combining section for combining the light beams from the respective solid state light sources together, said plurality of light sources and said light combining section being integrated together within said light source unit,
         a light condensing lens housing in which said predetermined light condensing lens is housed,
   said projection unit including:
      an optical modulator for modulating said concentrated output light beam, based on information of an input signal, and
      a projection optical section for projecting the light beam from said optical modulator in the form of an image onto a predetermined screen, wherein
   said light source unit and said projection unit are configured to be separable from and connectable to each other,
   said light source unit and said projection unit include a light source unit alignment mechanism and a projection unit alignment mechanism, respectively, capable of performing alignment so that an optical axis of said predetermined light condensing lens and an optical axis for an incident light beam set in said projection unit coincide with each other when said light source unit and said projection unit are coupled to each other, and
   said light source alignment mechanism includes a housing holding mechanism for coupling said light combining section to said light condensing lens housing, said housing holding mechanism having an elastic property for holding said light condensing lens housing slightly movable in relation to said light combining section.

2. The projection display apparatus according to claim 1, wherein
   said light source unit alignment mechanism further includes an outside surface of said light condensing lens housing,
   said projection unit alignment mechanism includes a projection unit positioning surface provided on an outside surface of said projection unit, and
   said outside surface of said light condensing lens housing and said projection unit positioning surface abut against each other when said light source unit and said projection unit are coupled to each other.

3. The projection display apparatus according to claim 2, wherein
   said outside surface of said light condensing lens housing is a tapered surface having a surface inclined inwardly in the direction of coupling to the projection unit, and
   said light source unit alignment mechanism further includes a light source unit stop surface including a plane perpendicular to the optical axis of the light beam from said light combining section, and
   said projection unit positioning surface includes
      a condenser guide surface disposed so as to be opposed to said tapered surface of said light condensing lens housing when said light source unit and said projection unit are coupled to each other, and
      a projection unit stop surface including a plane perpendicular to the optical axis for said incident light beam, and opposed to said light source unit stop surface when said light source unit and said projection unit are coupled to each other.

* * * * *